United States Patent [19]

White et al.

[11] Patent Number: 5,434,221
[45] Date of Patent: Jul. 18, 1995

[54] LOW MOLECULAR WEIGHT ISOOLEFIN POLYMER

[75] Inventors: Donald A. White, Edison; Lawrence W. Flatley, Somerville; Richard C. Yeh, Westfield, all of N.J.; Raymond F. Murphy, Baton Rouge, La.

[73] Assignee: Exxon Chemical Patents Inc., Wilmington, Del.

[21] Appl. No.: 103,879

[22] Filed: Aug. 9, 1993

Related U.S. Application Data

[60] Division of Ser. No. 23,462, Feb. 25, 1993, Pat. No. 5,262,489, which is a continuation of Ser. No. 572,569, Aug. 23, 1990, abandoned.

[51] Int. Cl.$^6$ .......................... C08F 8/50; C08F 212/06
[52] U.S. Cl. ........................ 525/333.6; 525/333.3; 525/333.4; 525/333.7; 525/333.8; 525/376; 525/387; 525/388; 525/938; 528/481; 528/501; 528/502 C
[58] Field of Search ................. 525/387, 333.3, 333.4, 525/333.6, 333.7, 333.8, 376, 388, 938; 528/481, 501, 502

[56] References Cited

U.S. PATENT DOCUMENTS 3,799,234  3/1974  Skidmore ..................... 159/2 E
4,578,430  3/1986  Davison ....................... 525/387

FOREIGN PATENT DOCUMENTS 0726234  12/1967  Belgium.

*Primary Examiner*—Fred Teskin
*Attorney, Agent, or Firm*—John Schneider; Myron B. Kurtzman

[57] ABSTRACT

A process is provided for producing a low molecular weight isoolefin polymer by contacting at conversion conditions a higher molecular weight saturated isoolefin polymer, for example, polyisobutylene or a copolymer of a $C_4$ to $C_7$ isoolefin and a para-alkylstyrene, in the melt phase, with an initiator, such as an oxygen-containing gas, an organic peroxide or an azo compound.

23 Claims, 2 Drawing Sheets

LOW MOLECULAR WEIGHT ISOOLEFIN POLYMER

This is a division of application Ser. No. 08/023,462, filed Feb. 25, 1993, now U.S. Pat. No. 5,262,489, which is a continuation of application Ser. No. 07/572,569, filed Aug. 23, 1990 now abandoned.

BACKGROUND OF THE INVENTION

1. Field of the Invention

The present invention relates to a process for producing low molecular weight isoolefin polymers from a higher molecular weight saturated isoolefin polymer.

2. Description of Information Disclosures

Processes for producing a lower molecular weight isoolefin polymer from a higher molecular weight saturated isoolefin polymer are known and include solution processes, in which the reaction is carried out in an appropriate solvent as the reaction medium and bulk or melt phase processes, in which the reaction is carried out with the polymer itself as the reaction medium. Because of the high viscosity of high molecular weight polymers, solution processes have been the focus of much academic work [e.g., L. M. Pyrkov and S. Ya. Frenkel, Russian Chemical Reviews, 32, 140 (1963)]. From an industrial point of view, solution processes have several disadvantages.

Firstly, the polymer must be dissolved. Polymer dissolution rates are typically low and the solubility of the polymer in the best solvents may also be limited, leading to long dissolution times (several hours) and large vessels to contain the dilute polymer solution. No such vessels are required in a bulk phase process. Secondly, as the polymer is diluted its reaction rate with any reagent is generally reduced, except for the unusual case of a reaction which has a zero order rate dependence on polymer concentration. Longer reaction times or higher reaction temperatures are needed to cope with the lower reaction rates, in addition to the necessarily larger size of the reaction vessels compared with those for a bulk phase process. Thirdly, the presence of a solvent presents the possibility of side reactions, not possible when the solvent is not present. Such side reactions not only may reduce desired reaction yields, but may give side products, which may present environmental health and safety problems. This is of particular concern as solvents are typically volatile and their reaction products may easily escape into the atmosphere. Fourthly, the polymer product must be recovered from solution. Again, additional vessels and time are required, compared to a bulk phase process. The recovery of polymers from solution is often the major component of the cost of production for polymers prepared by solution processes and this last point may often be the most significant debit for a solution process.

Because of these disadvantages of solution processes, a bulk or melt phase process for a polymer reaction is highly desirable.

The terms "bulk phase" and "melt phase" are used herein interchangeably.

Bulk phase processes for producing a lower molecular weight isoolefin polymer, such as isobutylene polymer, from a higher molecular weight saturated isoolefin polymer, such as a higher molecular weight isobutylene, in the absence of a free radical initiator by thermal or mechanical means are known. The product produced by such processes is often discolored.

U.S. Pat. No. 3,634,381 discloses a process and apparatus for the degradation of high molecular weight polyisobutylene in a specified screw extruder at specified conditions. See also U.K. patent 1,293,671.

European patent application, Publication No. 0,035,677 A 1, discloses a process for the degradation of high molecular weight polyisobutylene at a temperature of 150° to 400° C. in the presence of tocopherol as heat stabilizer to prevent carbon deposition during degradation.

European patent application, Publication No. 0 111 391 A 2, discloses a process for reducing the molecular weight of unsaturated isoolefin polymers, such as butyl rubber, and halobutyl rubber, wherein the unsaturated polymer is masticated, in the melt phase, in the presence of ozone at a temperature of 20° to 22° C. The process is performed in an internal mixer, such as a Banbury mixer or an extruder.

U.S. Pat. No. 4,614,772 discloses a process for producing a low molecular weight isobutylene-conjugated diene copolymer, such as butyl rubber, by feeding an unsaturated higher molecular weight isobutylene-conjugated diolefin copolymer, such as an isobutylene-isoprene copolymer, into an extruder and contacting the unsaturated higher molecular weight copolymer, with an oxygen-containing gas, such as air, in the absence of an antioxidant and in the absence of an added free radical initiator.

European patent application 8530778.2, Publication No. 0 180 446 A2, discloses a process for the production of a low molecular weight isobutylene-conjugated diene diolefin polymer by reacting an unsaturated isobutylene-conjugated diolefin polymer of higher molecular weight with an oxygen-containing gas, such as air, in a specified twin screw extruder at specified conditions.

The term "saturated" is used herein to denote that the polymer is made by the polymerization or copolymerization of only mono-olefinic monomers (e.g., isobutylene, styrene, para-methylstyrene). The term "unsaturated" is used herein to denote that the polymer is made by the copolymerization of a mixture containing at least one diolefinic monomer (e.g., isoprene) and that for every molecule of the diolefinic monomer incorporated into the copolymer one olefinic double bond is produced in the copolymer.

U.S. Pat. No. 3,862,265 discloses a process for modifying the rheological or chemical properties of a polymer which is normally solid at room temperature, in an extruder. A free radical may be introduced into a reaction zone of the extruder. The process is stated to be suitable for modifying all classes of elastomers, including natural rubber, polyisobutylene, butyl rubber, etc. (See Col. 4, lines 42 to 48). It discloses that many polymers, particularly polyolefins, can be suitably narrowed in their molecular weight distribution by this process (Col. 5, lines 26 to 32).

It has now been found that a low molecular weight isoolefin polymer can be produced from a higher molecular weight saturated isoolefin starting material, in the melt phase, in the presence of a molecular oxygen-containing gas or a specified free radical initiator to produce a low molecular weight polymer having a molecular weight distribution substantially the same or broader than that of the high molecular weight saturated polymer starting material.

SUMMARY OF THE INVENTION

Figure 1:
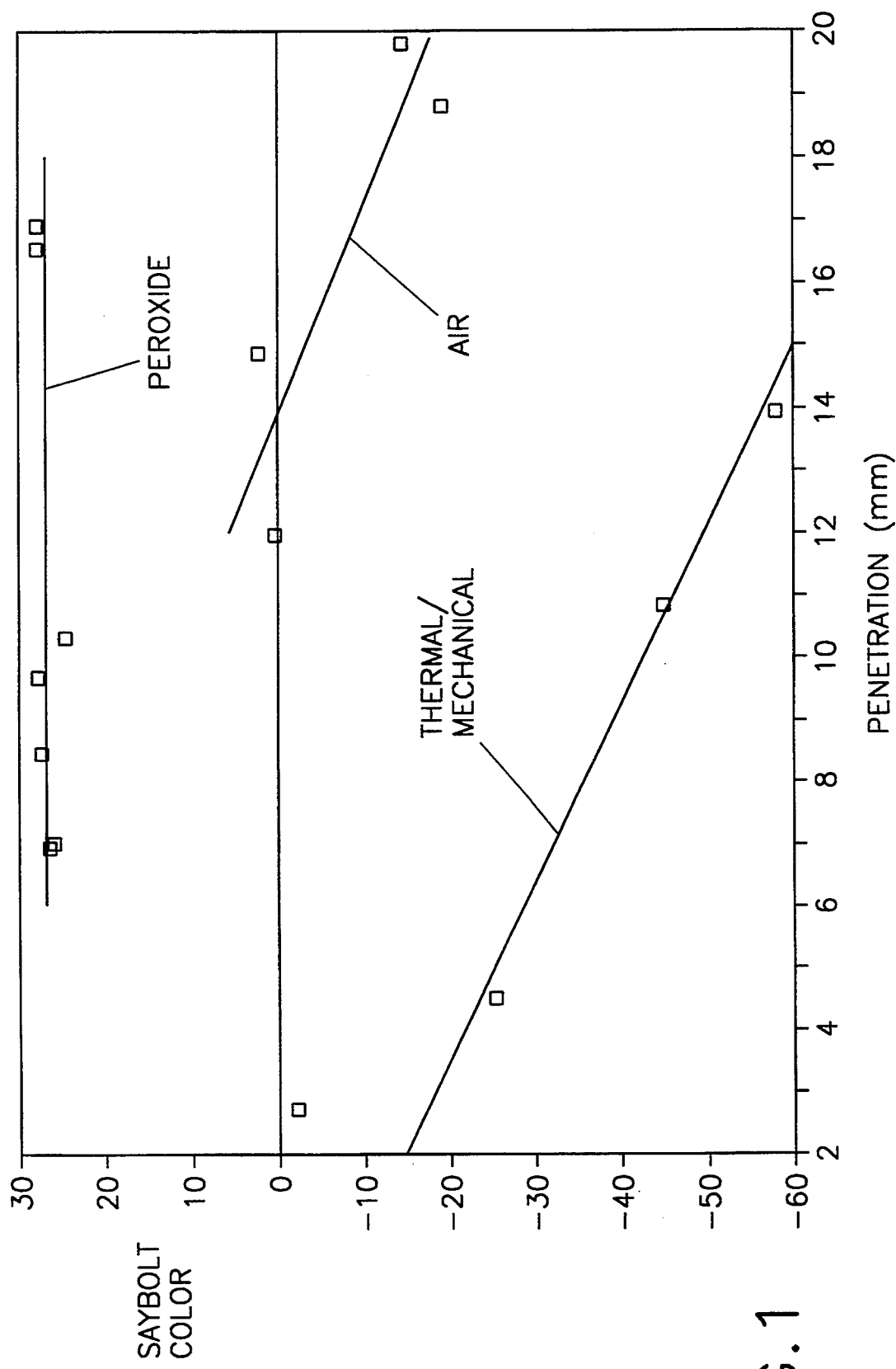
FIG. 1 is a graph showing Saybolt color versus penetration in the degradation of polyisobutylene.

In accordance with the invention, there is provided a process for producing a low molecular weight isoolefin polymer, which comprises the step of: contacting, in the melt phase, in a conversion zone, at conversion conditions, a high molecular weight saturated isoolefin polymer selected from the group consisting of polyisobutylene, a copolymer of an isoolefin having from 4 to 7 carbon atoms and styrene, a copolymer of an isoolefin having from 4 to 7 carbon atoms and a para-alkylstyrene, with an initiator selected from the group consisting of a molecular oxygen-containing gas at a pressure of at least about 1 pound per square inch gauge, an organic peroxide have a 10-hour half-life temperature greater than about 110° C., an azo compound having a 10-hour half-life temperature greater than about 110° C., to produce a conversion product including a lower molecular weight isoolefin polymer having a molecular weight distribution at least equal to the molecular weight distribution of said high molecular weight saturated isoolefin polymer.

DETAILED DESCRIPTION OF THE INVENTION

The high molecular weight saturated isoolefin polymers suitable as starting material for the process of the present invention include polyisobutylene, a copolymer of a $C_4$ to $C_7$ isoolefin and a vinyl aromatic compound such as styrene, and a para-alkylstyrene, particularly para-methylstyrene. The number average molecular weight of the starting material is generally above 100,000.

Suitable polyisobutylene starting material for the conversion process of the present invention may be high molecular weight (e.g., viscosity average molecular weight above about 400,000 or a number average molecular weight above about 200,000) polyisobutylene which has been prepared by a conventional method.

Suitable copolymers of isoolefins having from 4 to 7 carbon atoms and a vinyl aromatic compound include a copolymer of an isoolefin and styrene, and a copolymer of an isoolefin and a para-alkylstyrene.

High molecular weight copolymers of isoolefins having from 4 to 7 carbon atoms and styrene suitable as starting material for the process of the present invention may comprise from above zero to about 20 mole percent, preferably from about 1 to about 10 mole percent of the styrene moiety. The number average molecular weight of the isoolefin-styrene copolymers, as measured by gel permeation chromatography may be above about 100,000. Processes for the preparation of the copolymer of an isoolefin and styrene are well known and form no part of this invention.

Suitable copolymers of $C_4$ to $C_7$ isoolefin and a para-alkylstyrene as starting materials for the process of the present invention may be high molecular weight copolymers thereof made by any process which produces high molecular weight copolymers having a molecular weight, measured by gel permeation chromatography, of above about 100,000. Preferably, the copolymers of an isoolefin and a para-alkylstyrene useful as starting material for the conversion process of the present invention include copolymers of an isoolefin having from 4 to 7 carbon atoms and a para-alkylstyrene in which the copolymer has a substantially homogeneous compositional distribution, such as those described in European patent application 89305395.9 filed May 26, 1989 (Publication No. 0344021 published Nov. 29, 1989), which include the para-alkylstyrene moiety represented by the formula:

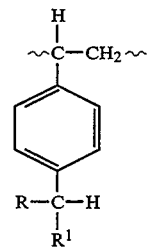

in which R and $R_1$ are independently selected from the group consisting of hydrogen, alkyl preferably having from 1 to 5 carbons and mixtures thereof. Furthermore, the para-alkylstyrene moiety is shown as being pendant from the isoolefin polymer chain represented by the wavy lines.

The preferred isomonoolefin comprises isobutylene. The copolymers of a $C_4$ to $C_7$ isomonoolefin and para-alkylstyrene generally comprise at least about 0.5 weight percent of the para-alkylmoiety. For elastomer copolymer products, the para-alkylstyrene moiety may range from about 0.5 weight percent to about 20 weight percent, preferably from about 1 to about 10 weight percent. The preferred para-alkylstyrene comprises para-methylstyrene. Suitable copolymers of an isomonoolefin and a para-alkylstyrene include copolymers having a number average molecular weight ($\overline{M}_n$) of at least about 100,000. These copolymers, as determined by gel permeation chromatography (GPC), demonstrate narrow molecular weight distributions and substantially homogeneous compositional distributions, or compositional Uniformity over the entire range of compositions thereof. At least about 95 weight percent of the copolymer product has a para-alkylstyrene content within about 10 weight percent, preferably within about 7 weight percent, of the average para-alkylstyrene content for the overall composition, and preferably at least about 97 weight percent of the copolymer product has a para-alkylstyrene content within about 10 weight percent and preferably within about 7 weight percent, of the average para-alkylstyrene content for the overall composition. This substantially homogeneous compositional uniformity thus particularly relates to the intercompositional distribution. That is, with the specified copolymers, as between any selected molecular weight fraction the percentage of para-alkylstyrene therein, or the ratio of para-alkylstyrene to isoolefin, will be substantially the same, in the manner set forth above.

In addition, since the relative reactivity of para-alkylstyrene with isoolefin such as isobutylene is close to one, the intercompositional distribution of these copolymers will also be substantially homogeneous. That is, these copolymers are essentially random copolymers, and in any particular polymer chain the para-alkylstyrene and isoolefin units will be essentially randomly distributed throughout that chain.

Various methods may be used to produce the copolymer of isomonoolefin and para-alkylstyrene, as described in said European publication. Preferably, the polymerization is carried out continuously in a typical continuous polymerization process using a baffled tank-type reactor fitted with an efficient agitation means, such as a turbo mixer or propeller, and draft tube, external cooling jacket and internal cooling coils or other means of removing the heat of polymerization, inlet pipes for monomers, catalysts and diluents, temperature sensing means and an effluent overflow to a holding drum or quench tank. The reactor is purged of air and moisture and charged with dry, purified solvent or a mixture of solvent prior to introducing monomers and catalysts.

Reactors which are typically used in butyl rubber polymerization are generally suitable for use in a polymerization reaction to produce the desired para-alkylstyrene copolymers suitable for use in the process of the present invention. The polymerization temperature may range from about minus 35° C. to about minus 100° C., preferably, from about minus 40° to about minus 80° C.

The processes for producing the copolymers can be carried out in the form of a slurry of polymer formed in the diluents employed, or as a homogeneous solution process. The use of a slurry process is, however, preferred, since in that case, lower viscosity mixtures are produced in the reactor and slurry concentration of up to 40 weight percent of polymer are possible.

The copolymers of isomonoolefins and para-alkylstyrene may be produced by admixing the isomonoolefin and the para-alkylstyrene in a copolymerization reactor under copolymerization conditions in the presence of a diluent and a Lewis acid catalyst.

Typical examples of the diluents which may be used alone or in a mixture include propane, butane, pentane, cyclopentane, hexane, toluene, heptane, isooctane, etc., and various halohydrocarbon solvents which are particularly advantageous herein, including methylene chloride, chloroform, carbon tetrachloride, methyl chloride, with methyl chloride being particularly preferred.

An important element in producing the copolymer is the exclusion of impurities from the polymerization reactor, namely, impurities which, if present, will result in complexing with the catalyst or copolymerization with the isomonoolefins or the para-alkylstyrene, which in turn will prevent one from producing the para-alkylstyrene copolymer product useful in the practice of the present invention. Most particularly, these impurities include the catalyst poisoning material, moisture and other copolymerizable monomers, such as, for example, meta-alkylstyrenes and the like. These impurities should be kept out of the system.

In producing the suitable copolymers, it is preferred that the para-alkylstyrene be at least 9.5 weight percent pure, preferably 97.5 weight percent pure, most preferably 99.5 weight percent pure and that the isomonoolefin be at least 99.5 weight percent pure, preferably at least 99.8 weight percent pure and that the diluents employed be at least 99 weight percent pure, and preferably at least 99.8 weight percent pure.

The most preferred Lewis acid catalysts are ethyl aluminum dichloride and preferably mixtures of ethyl aluminum dichloride with diethyl aluminum chloride. The amount of such catalysts employed will depend on the desired molecular weight and the desired molecular weight distribution of the copolymer being produced, but will generally range from about 20 ppm to 1 weight percent and preferably from about 0,001 to preferably from about 0.001 to 0.2 weight percent, based upon the total amount of monomer to be polymerized.

If desired, the copolymer of isoolefin and a para-alkylstyrene may be halogenated. The halogenated copolymer may be used as starting material for the process of the present invention. Generally, the halogenation is conducted in a manner similar to the halogenation of butyl rubber.

Furthermore, the comonomer of any of the suitable isoolefin copolymer starting materials may be additionally functionalized, for example, halogenated, prior to the initiator contacting step of the present invention.

A suitable high molecular weight saturated isoolefin polymer is contacted, in the melt phase, at conversion conditions, that is, conversion from higher to lower molecular weight polymer, in a conversion zone, with an initiator to produce the corresponding lower molecular weight isoolefin polymer. By the term "corresponding" with reference to the polymer is intended herein that if the starting material is a given polymer such as polyisobutylene, the corresponding lower molecular weight polymer will be also a polyisobutylene. It should be noted that when certain initiators are used, such as certain peroxides, under certain operating conditions, utilizing the high molecular weight polyisobutylene, the conversion product may comprise a mixture of low molecular weight polyisobutylene as well as an oxygenated low molecular weight polyisobutylene, that is, a low molecular weight polyisobutylene having oxygen moieties. Suitable conversion conditions include a temperature ranging from about 75° to about 275° C., preferably from about 150° to about 250° C.

The contacting step at conversion conditions is conducted while the starting material polymer is being masticated and sheared. The mastication and shearing can be performed in an internal mixer such as a Brabender mixer, a Banbury mixer or an extruder. Preferably, the contacting step at conversion conditions is performed in an extruder which can be a single or multiple screw extruder. The extruder can be of any type of design suitable to handle polymer reactions. For example, the extruder can be such as the one disclosed in U.S. Pat. No. 3,862,265, the teachings of which are hereby incorporated by reference.

An initiator is introduced into the conversion zone (herein also referred to as reaction zone) to contact the fluid starting polymer at conversion conditions. Optionally, if desired, a diluent such as a hydrocarbon or a halogenated hydrocarbon, for example, 1,1,2-trichlorotrifluoroethane (Freon® 113, Dupont), may also be introduced into the conversion zone. The diluent may be a volatilizable material or the diluent such as, for example, a hydrocarbon oil may remain with the polymer product.

Suitable initiators include an added molecular oxygen-containing gas, a free radical initiator, Such as an organic peroxide having a 10-hour half-life temperature greater than about 110° C., or an azo compound having a 10-hour half-life temperature greater than about 110° C. The oxygen-containing gas may be oxygen, e.g., commercial oxygen, a gaseous mixture comprising oxygen and a chemically inert gas, such as air, and mixtures thereof (e.g., air enriched with oxygen). The gaseous mixture may be a dilute oxygen-containing mixture comprising from 5 to 30 volume percent of oxygen. A preferred oxygen-containing gas is air. When a molecular oxygen-containing gas is added to the conversion zone, it is introduced into the conversion zone at a pressure of at least about one pound per square inch gauge (psig), and suitably at a pressure ranging from about 1 to 1000 pounds per square inch gauge and at a rate ranging from about: 0.5 to 25 percent of the polymer throughput rate in kg per hour.

Suitable organic peroxides for use as free radical initiators include: dicumyl peroxide, alpha, alpha-bis(t-butylperoxy)diisopropylbenzene; 2,5-dimethyl-2,5-di(t-butylperoxy)hexane; t-butyl cumyl peroxide; di-t-butyl peroxide; 2,5-dimethyl-2,5-di(t-butylperoxy)hexyne, and mixtures thereof.

The organic peroxide is introduced into the conversion zone in an amount sufficient to provide from about 0.0005 to about 0.5, preferably from about 0.01 to about 0.2 weight percent of the active oxygen per weight of starting material polymer being contacted.

Suitable azo compounds having a 10-hour half-life temperature greater than about 110° C. include azo ethers and azo esters, such as 2,2'-azobis(2-acetoxypropane).

The azo compound free radical initiator is utilized suitably in an amount ranging from about 0.0005 to about 0.5, preferably from about 0.01 to about 0.2 weight percent of azo nitrogen, based on the weight of the polymer starting material.

The high molecular weight saturated isoolefin polymer starting material and the initiator are contacted, in the conversion zone, such as the conversion zone of an extruder, for a time sufficient to produce a lower molecular weight isoolefin polymer corresponding to the actual starting material used, preferably to produce a lower molecular weight isoolefin polymer having a number average molecular weight, as measured by gel permeation chromatography, ranging from about 1 to about 75 percent, preferably from about 5 percent to about 35 percent of the number average molecular weight of the high molecular weight saturated isoolefin polymer starting material. The contacting step is performed in a conversion zone provided with mixing, masticating, and shearing means so as to mix, masticate and shear the fluid polymer starting material during the contact with the initiator at conversion conditions. The mixing is generally continued for a period of time equivalent to at least 5, preferably at least 15 half-lives of the initiator's thermal decomposition.

The conversion product resulting from the contacting step at conversion conditions comprises the desired lower molecular weight isoolefin polymer and by-products resulting from the decomposition of the initiator. Solid particles, such as gel, charred particles or other solid contaminants may also be present in the conversion product. Therefore, it is desirable to subject the conversion product to a devolatilization step which may be conducted, for example, in a devolatilization zone of an extruder. The devolatilization may be performed in more than one devolatilization zones. The devolatilization is carried out by applying a vacuum to the devolatilization zone containing the conversion product to remove the volatile by-products or by introducing a stripping agent into the devolatilization zone to contact the conversion product and strip the volatilizable by-products from the conversion product. The stripping gas may be an inert gas, such as nitrogen or argon, or a gas that reacts with the by-product, for example, steam, which can form hydrogen bonds when the by-product is an alcohol or other hydroxylic compound.

DESCRIPTION OF THE PREFERRED EMBODIMENT

For simplicity of description in the description of the preferred embodiment, high molecular weight polyisobutylene will be used as representative high molecular weight saturated isoolefin polymer starting material.

A bale of a high molecular weight polyisobutylene starting material having a number average molecular weight of about 400,000, is comminuted to a particle size suitable for feeding into a conventional 2-inch screw diameter extruder-reactor comprising at least three zones, namely, a heating zone, a conversion zone and a devolatilization zone (which may be in multiple sections). The extruder may be a single or multiple screw extruder. The particulate polyisobutylene polymer starting material is introduce into the heating zone of the extruder wherein it is heated to make the starting material polymer fluid and to bring it to conversion (reaction) temperature, for example, to a preferred temperature ranging from 150° to 250° C. The high molecular weight polyisobutylene is introduced into the heating zone at a rate ranging from about 50 to 200 kg per hour, for example, at a rate of 100 kg per hour. If desired, an optional diluent such as a hydrocarbon, e.g. hexane, or a chlorohydrocarbon may be added to the polymer in the heating zone. This diluent may subsequently be volatilized or if desired, the diluent may remain with the product of the process. An organic peroxide free radical initiator such as 2,5-dimethyl-2,5-(di-t-butyl peroxy) hexane, is introduced into the heating zone to contact the fluid high molecular weight polyisobutylene polymer. The organic peroxide is introduced in an amount sufficient to provide from about 0.01 to about 0.1 weight percent active oxygen, based on the weight of the polyisobutylene starting material.

The fluid high molecular weight polyisobutylene (with or without diluent) and organic peroxide then flow into the conversion zone of the extruder which is maintained at preferred conversion conditions, e.g. about 230° C. In the conversion zone, the free radical initiator is mixed with the fluid polyisobutylene which is being simultaneously masticated and sheared by conventional means present in the extruder. The mixing with the free radical initiator is continued for a time period equivalent to at least 5, preferably 15 half-lives of the thermal decomposition of the initiator. For this specific embodiment utilizing the specified organic peroxide, this would be at least about 2 seconds, preferably at least about 7 seconds of residence time in the conversion zone. Contact of the organic peroxide and the polyisobutylene at conversion conditions in the conversion zone of the extruder is conducted at conditions to produce a lower molecular weight polyisobutylene having, for example, a Brookfield viscosity at 177° C. ranging from 10,000 to 70,000 centipoises (cps). The conversion product resulting from the contacting step comprises the lower molecular weight polyisobutylene, volatile undesired by-products which resulted from the decomposition of the specific organic peroxide used, e.g. acetone, tertiary butanol, etc., and solid particles such as gel and charred particles and/or solid contaminants. An oxygenated lower molecular weight polyisobutylene may also be present in the conversion product when peroxides are used as initiator. The conversion product is passed to a devolatilization zone of the extruder maintained at a temperature of 200° to 230° C. A vacuum is applied to the devolatilization zone to remove the volatile by-products from the zone. The stripped by products are removed from the devolatilization zone through a conventional outlet means. The devolatilized conversion product is removed from the extruder and passed to an external filtration zone comprising filter means to remove the solid particles from the devolatilized conversion product. The devolatilized and filtered conversion product comprising the desired lower molecular weight polyisobutylene polymer is desirably passed to a cooling zone, such as heat exchanger to cool the product to a temperature ranging from about 100° to 150° C. to minimize the possibility of further chemical reaction or discoloration prior to storing or packaging the product. Controlled cooling can also be carried out, in part, during the external filtration step.

The lower molecular weight polyisobutylene polymer or mixture of lower molecular weight polyisobutylene polymer and oxygenated lower molecular weight polyisobutylene polymer resulting from the process of the present invention can be used as a component in adhesives, sealants, and provided it is produced under conditions to meet food grade requirements, as a base stock for chewing gum.

The following examples are presented to illustrate the invention. All parts and percentages referred to in the examples are by weight unless otherwise indicated.

The following polymers were used in the examples:

Polymer A was a high molecular weight polyisobutylene. By gel permeation chromatography, its molecular weight averages were $\overline{M}_w = 853,000$ and $\overline{M}_n\ 358,000$.

Polymer B was a copolymer of isobutylene and para-methylstyrene. By proton nuclear magnetic resonance, its para-methylstyrene content was estimated to be about 2.2 mole percent by gel permeation chromatography, its molecular weight averages were $\overline{M}_w = 680,000$ and $\overline{M}_n = 273,000$.

LUPERSOL®, 130, Atochem North America, is a free radical initiator, comprising from 90 to 95 wt. % 2,5-dimethyl-2,5-di(t-butylperoxy)hexyne.

LUPERSOL®, 101, Atochem North America, is a free radial initiator comprising 90 wt. % of 2,5-dimethyl-2,5 di(t-butylperoxy)hexane.

COMPARATIVE EXAMPLES I TO IV

These examples were carried out in a Brabender mixer using thermal/mechanical initiation. Polymer A was charged to the preheated mixer and mixed for the time period and at the temperature indicated in Table I.

The extent of molecular weight reduction of the product was estimated by a penetration test. In this test, the depth (in mm) to which a needle of standard weight and sharpness penetrates a sample of the product at 25° C. is measured. Higher penetration values correspond to lower molecular weights. For attractive commercial products, penetration values in the range 10 to 20 mm are desirable. The color of the products was measured by the Saybolt method using 10 percent by weight solutions of the products in toluene. On the Saybolt scale, a value of 30 corresponds to a water white product and lower values to more colored products. For attractive commercial products, Saybolt color values in the range 25 to 30 are desirable. The results show (Table I) that this process, relying upon thermal/mechanical initiation, can produce products with desirable penetration values, but they are very discolored.

Examples I to IV are not examples of the present invention.

EXAMPLES V TO VIII

These examples were carried out in the manner of Examples I to IV, except that air, at the pressure indicated in table I, was used as the initiator. The results (Table I) show that, even though the feed polymer did not contain in-chain unsaturation, air was an efficient initiator for its molecular weight reduction. In comparison with the thermal/mechanical process at a comparable reaction temperature, (cf examples II and VII in Table I), a product with a higher penetration value (i.e., lower molecular weight) and higher Saybolt color value (i.e., less colored) was obtained in a shorter reaction time.

EXAMPLES IX TO XII

These examples were carried out in the manner of examples I to IV, except that a peroxide, Lupersol® 101, was used as the initiator. Polymer A was cut into about 30 pieces and an approximately equal portion of the peroxide was injected into each piece so that the total charge was as indicated in Table I. The results show that the peroxide was an initiator for the molecular weight reduction at much lower temperatures than those necessary when air or thermal/mechanical initiation was used and that, perhaps because of the lower reaction temperatures used, the product color was significantly improved.

EXAMPLES XIII TO XVI

These examples were carried out in the manner of examples IX to XII, except that, in addition to the peroxide, air was also added to the pressure indicated in Table I. The results show that products with penetration values and Saybolt color values similar to those of example IX to XII were obtained, i.e., the presence of air did not have a deleterious effect on the excellent product color observed for the products of the peroxide initiated process.

In FIG. 1, the penetration and Saybolt color data from Table 1 is plotted. This figure shows very clearly the superior balance of penetration and color properties for products obtained by the air (examples V to VIII) and peroxide (examples IX to XVI) initiated processes as compared to that from comparative examples I to IV.

EXAMPLES XVII TO XIX

These examples were carried out with Polymer A as the starting polymer and with an extruder as the reactor. A rubber chopper was used to comminute the bales of high molecular weight polymer. The extruder reactor was a Welding Engineers counterrotating nonintermeshing twin screw machine with overall L/D of 54. Provided in the extruder were in the following sequence, a heating zone (L/D=11.5), a reaction zone (L/D=13.5) and three vent zones (L/D=7.5 each). These five zones were separated from one another by screw elements sufficiently restrictive to generate dynamic polymer seals when the extruder was operating. After the final vent zone, the devolatilized degraded polymer passed through a pressure generating section to force it through the extruder die. The product exiting the die essentially as a liquid was allowed to flow into a drum. Samples for analysis were collected by placing a suitable container in the stream of polymer flowing into the collection drum.

The designation of the zones is intended to indicate their major function. However reaction may extend beyond the nominal reaction zone (i.e. conversion zone) and into at least the nominal first vent zone.

In the heating zone, there was provision for injection of the peroxide (Lupersol ® 101) into the polymer at a controlled and steady rate. Each of the vent zones had provision for the injection of nitrogen as a stripping agent to aid in devolatilizing the conversion product and each was connected to a vacuum system capable of sustaining a pressure of −100 kPa. A pressure of zero indicates atmospheric pressure.

Figure 2:
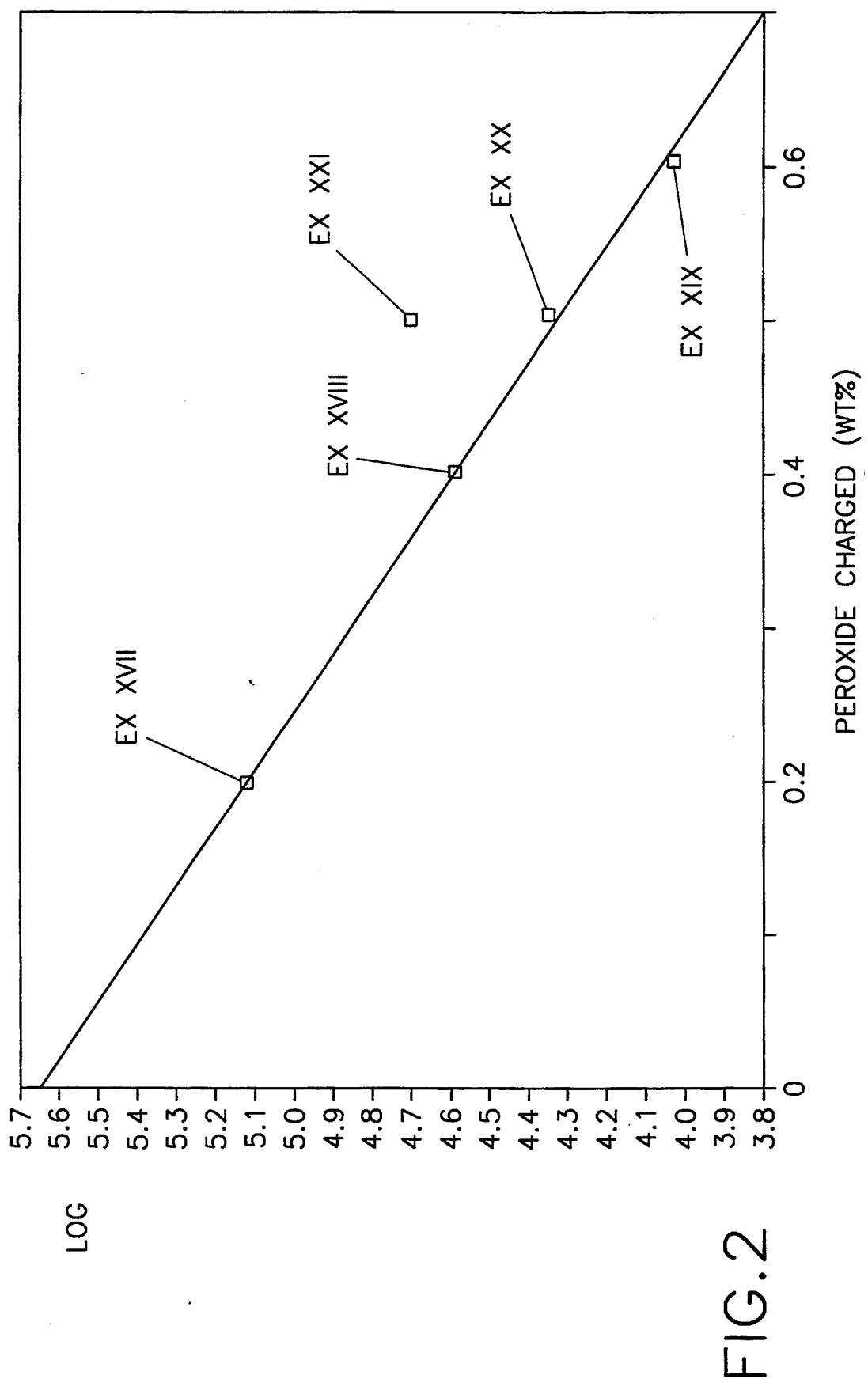
FIG. 2 is a graph showing the viscosity of polyisobutylene degradation product versus the amount of peroxide charged.

High molecular weight polyisobutylene (Polymer A) was fed at 100 kg/h. The peroxide (Lupersol ® 101) was metered as a 50% by weight solution in Freon ® 113 into the heating zone at the rate, expressed as a weight percentage of the polyisobutylene feed, indicated in Table II. Nitrogen, at a rate of 1.0 kg/h each, was fed to the second and third vent zones, which were maintained at as low a pressure as possible (−100 kPa) via the vacuum system. No nitrogen was fed to the first vent zone, which was maintained at a higher pressure than the second and third vent zones, as indicated in Table II. Samples of the degraded polymer exiting from the extruder die were collected and their extent of molecular weight reduction was estimated by measurement of Brookfield viscosity at 177° (ASTM D 3236). Lower Brookfield viscosities correspond to lower molecular weights. The level of tertiary butanol (TBA) in the products was measured by headspace gas chromatography. The viscosity and TBA measurements are shown in Table II and FIG. 2. They show that the process provides a degraded product with less than 100 ppm TBA, estimated to be suitable for food grade uses. Gel permeation chromatography measurements shown in Table II indicate broadening of molecular weight distribution.

EXAMPLE XX

This example was carried out in the manner of examples XVII to XIX, except that lower extruder temperatures were employed. Conditions and results are summarized in Table II and FIG. 2. This example illustrates the importance of extruder temperatures on venting efficiency. The lower temperatures used in this example lead to a product with higher TBA content, compared with the products from example XVII to XIX.

When operated in this manner, the process does not provide a product estimated to be usable in food grade usage. This is still, however, an example of the present invention, which is not limited to the production of such food grade products. Gel permeation chromatography measurements shown in Table II indicate broadening of molecular weight distribution.

EXAMPLE XXI

This example was carried out in the manner of examples XVII to XIX, except that the first vent zone was maintained at a pressure of −100 kPa. The conditions and results are summarized in Table II and FIG. 2. While a low molecular weight polyisobutylene with a TBA content satisfactory for food grade applications was obtained, it will be apparent that the peroxide was used with much lower efficiency than in examples XVII to XX, in which the first vent zone was maintained at a higher pressure. This is attributed to the stripping of the peroxide itself from polymer in the first vent zone, implying that it was not completely reacted at this point in the extruder and that the reaction continued beyond the reaction zone into the first vent zone.

Though the peroxide was not used with maximum efficiency, this example is still an example of the present invention. Gel permeation chromatography measurements in Table II indicate a broadening of the molecular weight distribution.

COMPARATIVE EXAMPLE XXII AND EXAMPLES XXIII TO XXV

These Examples were carried out in a Brabender mixer with Polymer B as the feed polymer. The peroxide used was 2,5-dimethyl-2,5-di(t-butylperoxy)hexyne (Lupersol ® 130). It was fed in the form of a masterbatch, which was prepared by mixing the peroxide (2.0 g) and Polymer B (98.0 g) on an unheated rubber mill.

The quantities of Polymer B and masterbatch used are indicated in Table III. The mixer was preheated to 230° C. Polymer B was charged to the mixer and mixed with a rotor speed of 60 rpm several minutes until the polymer reached 230° C. The peroxide masterbatch was then added and mixing was continued for a further 2 minutes. The discharged polymer was examined by gel permeation chromatography. The results are shown in Table III.

In Example XXII, in which no peroxide was charged, there is no reduction in molecular weight. This is a comparative example and not an example of the present invention.

In Examples XXIII to XXV, degradation of molecular weight occurred and was more extensive at higher peroxide charges. Examples XXIII to XXV are examples of the present invention.

Gel permeation chromatography measurements shown in Table III indicate no significant change in polymer molecular weight distribution.

TABLE I

POLYISOBUTYLENE MOLECULAR WEIGHT REDUCTION (BRABENDER MIXER)

| Exam. | Press. psig | L-101 wt. % | Temp. deg. C. | Time Min. | Penetration mm | Saybolt Color |
|---|---|---|---|---|---|---|
| I | 0.0 | 0.0 | 247 | 30.0 | 2.7 | −2.3 |
| II | 0.0 | 0.0 | 258 | 30.0 | 4.6 | −25.8 |
| III | 0.0 | 0.0 | 275 | 30.0 | 11.0 | −45.5 |
| IV | 0.0 | 0.0 | 277 | 40.0 | 14.0 | −57.8 |
| V | 2.5 | 0.0 | 265 | 30.0 | 18.8 | −19.0 |
| VI | 2.5 | 0.0 | 264 | 30.0 | 19.7 | −14.2 |
| VII | 10.0 | 0.0 | 258 | 18.0 | 11.9 | 0.4 |
| VIII | 10.0 | 0.0 | 263 | 24.0 | 14.8 | 2.6 |
| IX | 0.0 | 0.4 | 185 | 10.5 | 7.1 | 26.5 |
| X | 0.0 | 0.5 | 185 | 10.5 | 8.5 | 27.6 |
| XI | 0.0 | 0.6 | 185 | 10.5 | 9.7 | 28.1 |
| XII | 0.0 | 0.6 | 200 | 5.5 | 16.9 | 28.3 |
| XIII | 10.0 | 0.4 | 210 | 20.0 | 10.3 | 25.1 |
| XIV | 10.0 | 0.4 | 200 | 2.5 | 7.0 | 26.7 |
| XV | 10.0 | 0.4 | 200 | 4.0 | 7.0 | 26.7 |
| XVI | 10.0 | 1.0 | 194 | 5.0 | 16.5 | 28.3 |

TABLE II

Polyisobutylene Molecular Weight Reduction (Extruder Reactor)

| Exam. | L-101 wt. % | Vent 1 Press. kPa | React. Zone | Temperatures (°C.) Vent 1 Zone | Vent 2 Zone | Vent 3 Zone | Brookfield Viscosity cps | TBA ppm | $M_w$ kg | $M_n$ kg | $M_w/M_n$ |
|---|---|---|---|---|---|---|---|---|---|---|---|
| Feed | | | | | | | | | 853 | 357 | 2.4 |

TABLE II-continued

| | | Vent 1 | Temperatures (°C.) | | | Brookfield | | | | |
|---|---|---|---|---|---|---|---|---|---|---|
| Exam. | L-101 wt. % | Press. kPa | React. Zone | Vent 1 Zone | Vent 2 Zone | Vent 3 Zone | Viscosity cps | TBA ppm | $M_w$ kg | $M_n$ kg | $M_w/M_n$ |
| XVII | 0.20 | −15 | 222 | 212 | 239 | 232 | 126000 | 50 | 63 | 11.1 | 5.7 |
| XVIII | 0.40 | 0 | 221 | 206 | 228 | 226 | 37200 | 72 | 48 | 7.8 | 6.2 |
| XIX | 0.60 | 3 | 211 | 201 | 223 | 221 | 10400 | 80 | 44 | 7.9 | 5.6 |
| XX | 0.50 | 0 | 201 | 185 | 209 | 217 | 22550 | 173 | 43 | 7.3 | 5.9 |
| XXI | 0.49 | −100 | 214 | 209 | 238 | 229 | 51000 | 57 | | | |

TABLE III

Isobutylene/PMS Molecular Weight Reduction (Brabender Mixer)

| Example | Polymer g | Masterbatch g | L-130 wt. % | $M_w$ kg | $M_n$ kg | $M_w/M_n$ |
|---|---|---|---|---|---|---|
| Feed Polymer | | | | 681 | 273 | 2.5 |
| XXII | 45.0 | 0.0 | 0.00 | 684 | 278 | 2.5 |
| XXIII | 40.5 | 4.5 | 0.20 | 364 | 157 | 2.3 |
| XXIV | 27.0 | 18.0 | 0.80 | 257 | 105 | 2.4 |
| XXV | 9.0 | 36.0 | 1.60 | 170 | 72 | 2.4 |

What is claimed is:

1. A low molecular weight isoolefin polymer obtained by contacting, in the melt phase, in a conversion zone, at conversion conditions, a high molecular weight saturated copolymer of an isoolefin having from 4 to 7 carbon atoms and a para-alkylstyrene, with an initiator selected from the group consisting of a molecular oxygen-containing gas at a pressure of at least about 1 pound per square inch gauge, an organic peroxide having a 10-hour half-life temperature greater than about 110° C., an azo compound having a 10-hour half-life temperature greater than about 110° C., to produce a conversion product including a lower molecular weight isoolefin polymer having a molecular weight distribution at least equal to the molecular weight distribution of said high molecular weight saturated isoolefin copolymer.

2. The low molecular weight isoolefin polymer in accordance with claim 1 wherein said high molecular weight saturated isoolefin copolymer has a number average molecular weight above about 100,000.

3. The low molecular weight isoolefin polymer in accordance with claim 1 wherein said lower molecular weight isoolefin polymer has a number average molecular weight ranging from about 1 to about 75 percent of the number average molecular weight of said high molecular weight saturated isoolefin copolymer.

4. The low molecular weight isoolefin polymer in accordance with claim 1 wherein said copolymer is a copolymer of isobutylene and para-methylstyrene.

5. The low molecular weight isoolefin polymer in accordance with claim 1 wherein said initiator is a molecular oxygen-containing gas selected from the group consisting of oxygen, air and mixtures thereof.

6. The low molecular weight isoolefin polymer in accordance with claim 5 wherein said molecular oxygen-containing gas comprises air.

7. The low molecular weight isoolefin polymer in accordance with claim 1 wherein said initiator is an organic peroxide selected from the group consisting of dicumyl peroxide; alpha, alpha-bis (t-butylperoxy) diisopropylbenzene; 2,5-dimethyl-2,5-di(t-butylperoxy)-hexyne; t-butyl cumyl peroxide; di-t-butyl peroxide; 2,5-dimethyl-2,5-di(t-butylperoxy)hexane, and mixtures thereof.

8. The low molecular weight isoolefin polymer in accordance with claim 1 wherein said initiator is an azo compound selected from the group consisting of azo ethers, azo esters, and mixtures thereof.

9. The low molecular weight isoolefin polymer in accordance with claim 1 wherein said conversion conditions include a temperature ranging from about 75° to about 275° C.

10. The low molecular weight isoolefin polymer in accordance with claim 1 wherein said conversion conditions include a temperature ranging from about 150° to about 250° C.

11. The low molecular weight isoolefin polymer in accordance with claim 1 wherein said conversion product is subjected to a devolatization step to remove volatile products and, thereby, produce a devolatilized product.

12. The low molecular weight isoolefin polymer in accordance with claim 11 wherein said devolatization step is performed by contacting said conversion product with a stripping agent.

13. The low molecular weight isoolefin polymer in accordance with claim 11 wherein said devolatization step is performed by subjecting said conversion product to a vacuum.

14. The low molecular weight isoolefin polymer in accordance with claim 11 wherein said devolatilized product comprises solid particles and wherein said devolatilized product is filtered to remove at least a portion of said solid particles.

15. The low molecular weight isoolefin polymer in accordance with claim 14 wherein the resulting filtered product is passed to a heat exchange zone to decrease its temperature.

16. The low molecular weight isoolefin polymer in accordance with claim 1 wherein said contacting step is conducted in an internal mixer.

17. The low molecular weight isoolefin polymer in accordance with claim 16 wherein said internal mixer is an extruder.

18. The low molecular weight isoolefin polymer in accordance with claim 1 wherein prior to said contacting step said high molecular weight saturated isoolefin copolymer is heated to a temperature ranging from about 75° to about 250° C., and wherein, subsequently, the resulting heated high molecular weight saturated isoolefin copolymer is mixed with said initiator in a conversion zone for a time sufficient to produce said conversion product.

19. The low molecular weight isoolefin polymer in accordance with claim 1 wherein said high molecular weight copolymer is a copolymer of isobutylene and para-methylstyrene and wherein said lower molecular weight polymer is a copolymer of isobutylene and a para-methylstyrene having a number average molecular weight ranging from 50,000 to 200,000.

20. The low molecular weight isoolefin polymer in accordance with claim 1 wherein said initiator is an organic peroxide and wherein said organic peroxide is present in said conversion zone at a pressure ranging from about 1 to about 1000 pounds per square inch gauge and in an amount ranging from about 0.0005 to about 0.5 weight percent, active oxygen, based on the weight of said higher molecular weight polymer.

21. The low molecular weight isoolefin polymer in accordance with claim 1 wherein said high molecular weight copolymer is masticated during said contacting step with said initiator.

22. The low molecular weight isoolefin polymer in accordance with claim 21 wherein said mastication is performed in an extruder.

23. The low molecular weight isoolefin polymer in accordance with claim 22 wherein said high molecular weight copolymer is introduced into said extruder at a rate ranging from about 50 to about 200 kg per hour, said extruder having a screw diameter of 2 inches.

* * * * *